United States Patent [19]

Cecchi et al.

[11] 4,166,544
[45] Sep. 4, 1979

[54] PIPE-LAYING MACHINE FOR OIL PIPELINES, CONDUITS AND THE LIKE

[75] Inventors: Carlo Cecchi; Alberto G. Bifani, both of Turin, Italy

[73] Assignee: Fiat-Allis Macchine Movimento Terra S.p.A., Lecce, Italy

[21] Appl. No.: 827,467

[22] Filed: Aug. 25, 1977

[30] Foreign Application Priority Data

Sep. 7, 1976 [IT] Italy .............................. 69166 A/76

[51] Int. Cl.² .................................................. F16L 1/02
[52] U.S. Cl. .................................... 414/747; 212/145; 405/154
[58] Field of Search ................. 214/1 P, 1 PA, 394, 214/658; 212/56, 63, 145; 61/72.5, 72.7, 105; 405/154, 158, 169, 170

[56] References Cited

U.S. PATENT DOCUMENTS

| 2,967,628 | 1/1961 | Erdahl | 214/1 PA |
| 4,050,589 | 9/1977 | Dolza | 212/14 X |

Primary Examiner—Francis S. Husar
Assistant Examiner—George F. Abraham
Attorney, Agent, or Firm—August E. Roehrig, Jr.; Robert A. Brown; Harvey W. Rockwell

[57] ABSTRACT

A pair of self-propelled vehicles joined by an intermediate bridge having a rigid lifting arm hinged at one end to the intermediate bridge and having a device for gripping and lifting the pipes carried by the free end of the rigid arm such that the rigid lifting arm may be controlled to engage a pipe and lift it over the trench and lower the pipe into the desired position.

10 Claims, 3 Drawing Figures

PIPE-LAYING MACHINE FOR OIL PIPELINES, CONDUITS AND THE LIKE

BACKGROUND OF THE INVENTION

This invention relates in general to pipe-laying equipment, and, in particular, to apparatus operable from opposite sides of a trench for continuously lifting and laying pipe into the trench.

More specifically, but without restriction to the particular use which is shown and described, this invention relates to an apparatus including self-propelled vehicles positionable on opposite sides of a trench and connected through an intermediate connection bridge for lifting and positioning pipe within the trench.

Various types of pipe-laying equipment have been utilized to lift and position pipe within a trench. Such equipment includes self-propelled counterweighted vehicles which utilize counterweight apparatus to balance the vehicle during operation of the pipe-laying equipment. Such systems are generally employed along one side of a trench and, therefore, necessitate that the pipe-laying vehicle be counterweighted to maintain vehicle stability during the pipe-laying operation. Another type of pipe-laying system utilizes a carriage running along a bridge which extends across the trench. This latter type of pipe-laying system requires the use of control and driving means to position and stabilize the running carriage and requires a complicated and complex structure and controls for the equipment. It is, therefore, an object of this invention to improve pipe-laying equipment.

Another object of this invention is to simplify the structure and controls of pipe-laying equipment which is operable along both sides of a trench.

These and other objects are attained in accordance with the present invention wherein there is provided a pair of self-propelled vehicles joined by an intermediate bridge having a rigid lifting arm hinged at one end to the intermediate bridge and having a device for gripping and lifting the pipes carried by the free end of the rigid arm such that the rigid lifting arm may be controlled to engage a pipe and lift it over the trench and lower the pipe into the desired position.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein.

DESCRIPTION OF THE PREFERRED EMBODIMENT

Figure 1:
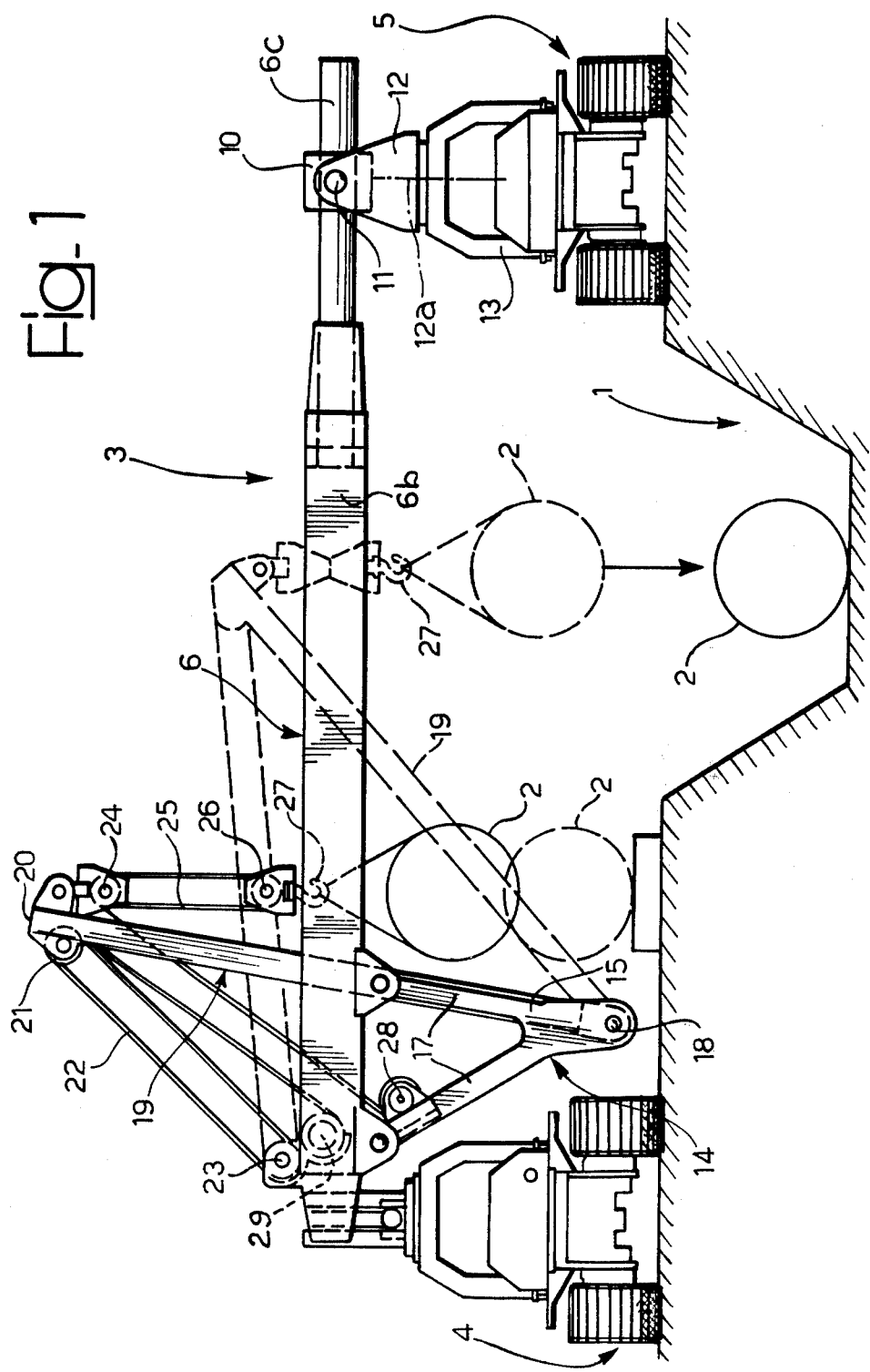
FIG. 1 is a front elevation view of a pipe-laying machine constructed in accordance with the present invention.

Referring now to FIG. 1, there is shown two self-propelled track-type vehicles, 4 and 5, commonly referred to as crawler tractors positioned on either side of a trench 1 dug in the ground and within which a pipe system 2 is to be placed. The two self-propelled crawler tractors 4 and 5 are positioned on opposite sides of the trench 1 and connected by an intermediate connection bridge 3 which is supported at opposite ends by each of the crawler tractors 4 and 5.

Figure 2:
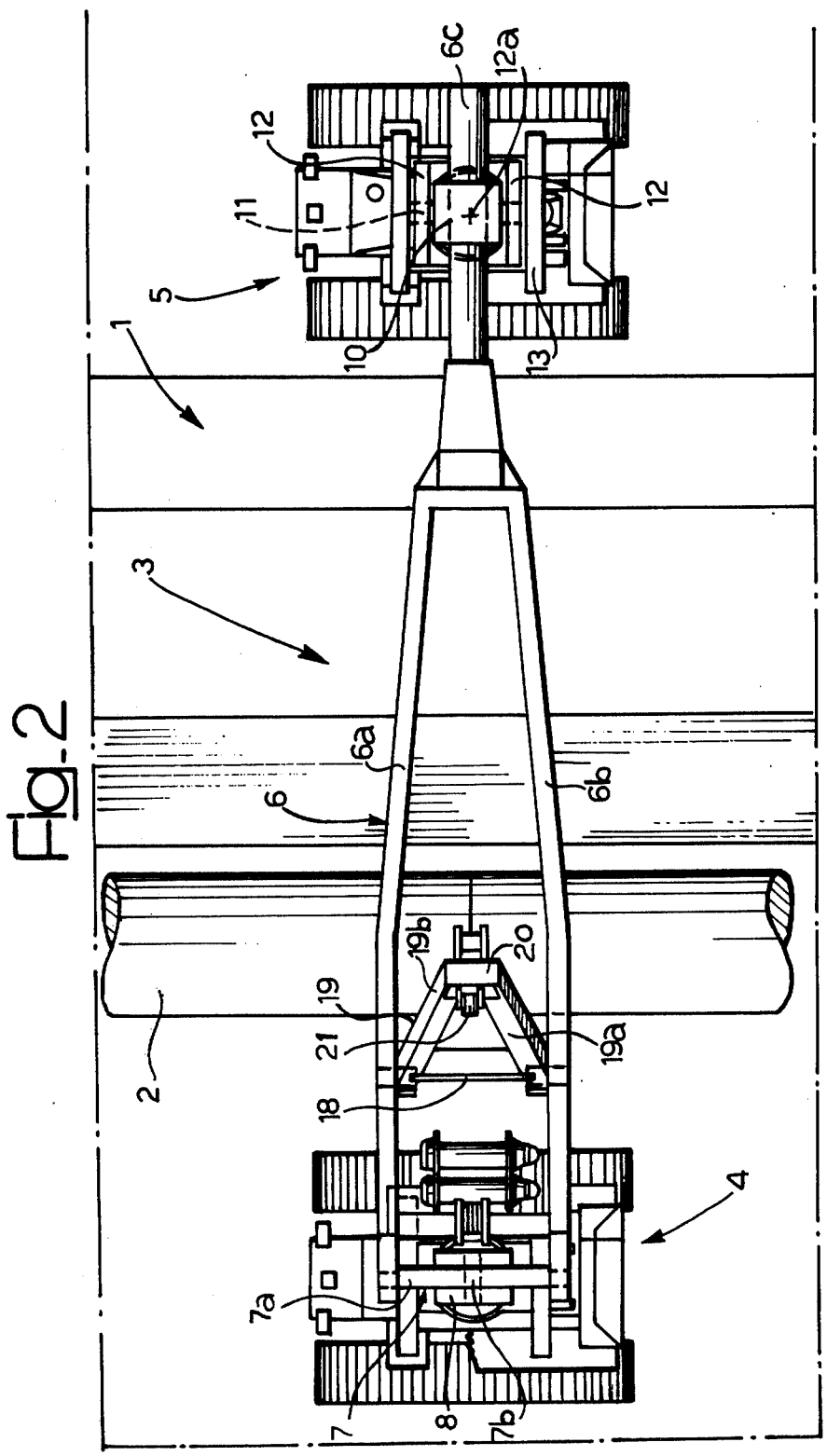
FIG. 2 is a horizontal plan view of the machine shown in FIG. 1 with the cables removed to better illustrate the structure of the intermediate bridge and the lifting arm.

The intermediate connection bridge 3 is formed of a fork-shaped structure 6 (best shown in FIG. 2) comprising side arms 6a and 6b which are supported at their free end from the crawler tractor 4 and a central leg 6c which is supported at the free end from the crawler tractor 5. Each of the free ends of the side arms 6a and 6b are supported for pivotal movement in a plane normal to the working surface or support plane of the crawler tractor 4 by a cross-brace structure 7. The free ends of the side arm 6a and 6b are pivotally hinged onto a cross arm 7a of the cross-brace structure 7, and this structure is pivotally connected to a pivotally supported arm 6b carried in a support structure 8 (best seen in FIGS. 2 and 3) with its longitudinal axis normal to the longitudinal or pivot axis of the arm 7a. The support structure 8 is pivotally hinged onto a framework 9 rigidly secured to the self-propelled crawler tractor 4 to allow the support structure 8 to pivot about an axis perpendicular to the support plane of the crawler tractor itself.

At the other end of the fork-shaped structure 6 of the free end of the central leg 6b is constructed in the form of a cylinder. The free end may, therefore, slide axially or laterally of the self-propelled supporting crawler tractor 5, as well as be rotated relative thereto through a tubular support body 10 which supports the free end of the central leg 6c on the crawler tractor 5. The tubular support body 10 is pivotally hinged about a pin 11 which extends in an axis normal to the longitudinal axis of the central leg 6c to allow pivotal movement of the fork-shaped structure 6 in a plane normal to the tractor support surface. The pivot pin 11 is supported in a clevis-like structure 12 which is rotatably mounted on a support framework 13 rigidly connected to the self-propelled crawler tractor 5 to allow the clevis-like structure 12 to pivot about an axis 12a perpendicular to the support plane of the crawler tractor 5.

Figure 3:
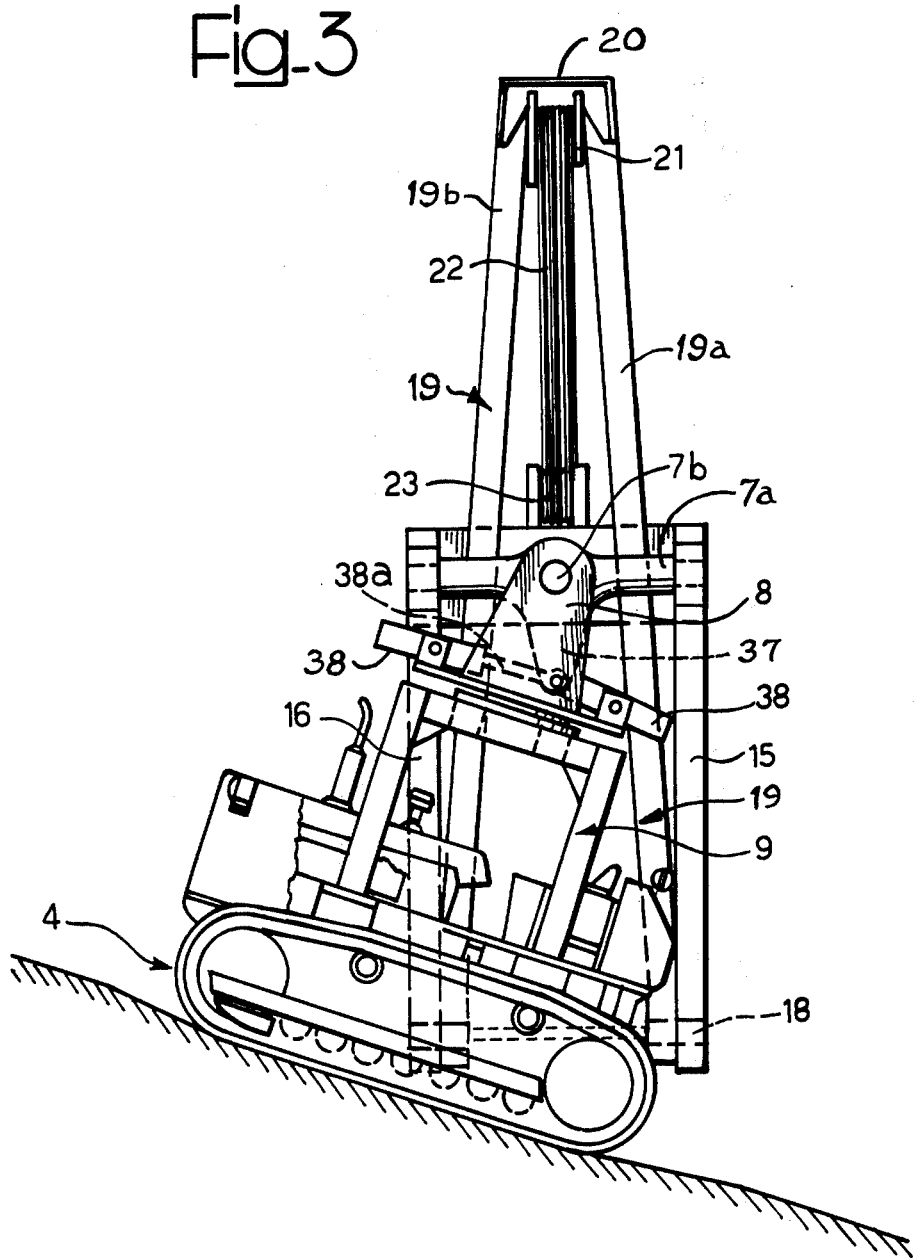
FIG. 3 is a side elevation view of one of the self-propelled vehicles utilized in the pipe-laying equipment to better illustrate the manner in which the intermediate bridge may be positioned relative to the vehicles.

The intermediate connection bridge extending between the two self-propelled crawler tractors 4 and 5 is, therefore, supported by two ball joints at its end to compensate for variations in the terrain forming the support surface for the tractors. To effect pivoting of the bridge about the longitudinal axis of the fork-shaped structure 6 the cross-brace structure 7 has a projection 37 extending downwardly from the arm 7a. The free end of the projection 37 is hingedly connected to actuating rods 38a of two opposed hydraulic actuators 38. By operating the hydraulic actuators 38 it is therefore possible to rotate the cross-braced structure 7 about the axis of the arm 7b to effect rotation of the intermediate connection bridge 3 about its longitudinal axis as best seen in FIG. 3. The two self-propelled tractors can, therefore, move independently relative to each other over variable terrain within the limits determined by the dimensions of the structure of the intermediate connecting bridge and by the constructional characteristics in the type of coupling which supports the two ends of the connecting bridge on the self-propelled crawler tractors 4 and 5. However, the two ball joint connections formed between the connecting bridge 3 and the two self-propelled crawler tractors 4 and 5 allow the apparatus to be utilized on varying grades about all axes of the crawler tractor.

The mechanism for raising the positioning of pipe 2 in the trench 1, is best described with reference to FIG. 1. A support framework 14 is formed by two V-section structures 15 and 16. The V-section structure 15 is fixed in relation to the free ends of its two diverging arms 17, onto the side arm 6b of th fork-shaped structure 6. Similarly, the V-section structure 16 is fixed to the side arm 6a of the fork-shaped structure 6 in a position parallel to the V-section structure 15. An interconnecting articulation pin 18 connects the two V-section structures 15 and 16 at the point of convergence of the diverging arms 17.

A rigid lifting arm 19 is fixed onto the articulation hinge formed by interconnecting pin 18 and positioned between the two parallel side arms 6a and 6b of the fork-shaped structure. The rigid lifting arm 19 is hinged onto the interconnecting pin 18 at the free end of its two diverging arms 19a and 19b as best seen in FIGS. 1 and 3. At the converging ends of the rigid arm 19, shown by reference numeral 20, there is supported a group of pulleys 21 about which a cable 22 passes and is wound through transmission pulleys 23 onto a winch 29. Operation of the winch 29 and pulley systems 23 and 21 varies the position of the rigid lifting arm 19 about the interconnecting articulation pin 18. A second group of pulleys 24 is supported from the end 20 of the lifting arm 19 and about which passes a cable 25 from which is suspended another group of pulleys 26 carrying a connecting hook 27.

During pipe-laying operation a pipe 2 is connected to the hook 27 and by operation of a winch 28, supported from one of the diverging arms 17 of the V-section structure 15 and to which the cable 25 is connected, the pipe is raised and lowered. The rigid arm 19 is disposed in an almost vertical position as shown in FIG. 1 when the pipe 2 is connected to the hook 27 and when the winch 28 is operated, lifting the pipe vertically. The winch 29 is operated rotating the rigid lifting arm 19 about the interconnecting articulation pin 18 until the pipe is in the position indicated by the dotted line in FIG. 1 above the bottom of the trench 1. The winch 28 is then again operated lowering the pipe 2 to rest on the bottom of the trench itself. The pipe is then disconnected and the winches 28 and 29 are again actuated to raise the hook and the rigid lifting arm structure while the two-self-propelled vehicles 4 and 5 are moved into a position to engage another section of pipe.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention but that the invention will include all embodiments falling within the scope of the appended claims.

What is claimed is:

1. An apparatus for laying pipe comprising
   bridge means for forming a support from which pipe is moved into position in a trench and supported on opposite sides of a trench into which a pipe is to be placed,
   a lifting arm pivotally supported at one end of said bridge means for engaging and moving a pipe into position in a trench upon pivotal movement of said lifting arm about its pivotal support and
   pivot means carried at each end of said bridge means for varying the position thereof relative to the supports on opposite sides of the trench.

2. Apparatus for laying pipe comprising
   a first and a second self-propelled vehicle positioned on opposite sides of a trench into which a pipe is to be placed,
   bridge means forming a support from which pipe is moved into position in the trench and supported at each end from said first and second self-propelled vehicles,
   lifting arm pivotally supported from one end of said bridge means for engaging and moving a pipe into position in the trench, upon pivotal movement of said lifting arm about its pivotal support and
   pivot means carried at each end of said bridge means for forming a universal connection between said bridge means and each of said first and second self-propelled vehicles to vary the position of said bridge means relative to said vehicles during pipe laying operation.

3. The apparatus of claim 2 wherein said lifting arm includes
   a pipe engaging hook supported from a free end of said lifting arm for engaging and moving a pipe into position in the trench, and
   actuating means supported from said bridge means and coupled to said lifting arm and pipe engaging hook for pivotally moving said lifting arm relative to said bridge means and moving said pipe engaging hook relative to the free end of said lifting arm.

4. The apparatus of claim 3 wherein said lifting arm is pivotally supported from said bridge means at a point lower than the universal pivot connection between said bridge means and each of said first and second self-propelled vehicles to increase stability during pipe-laying operation.

5. The apparatus of claim 4 wherein said pivot support for said lifting arm comprises a pair of parallel V-shaped support sections supported at the free end of their diverging portion from said bridge means and an interconnecting articulation pin coupled to said lifting arm for pivotally interconnecting said lifting arm and the converging portion of each of said V-shaped support sections.

6. The apparatus of claim 2 wherein said bridge means includes a support member having a bifurcated portion operatively coupled at the free ends thereof to said first self-propelled vehicle and a cylindrical portion operatively coupled at the free end thereof to said second self-propelled vehicle.

7. The apparatus of claim 6 wherein said lifting arm is supported from said bridge means for movement between the bifurcated portion of said support member.

8. The apparatus of claim 2 wherein said pivot means includes hydraulic actuators operatively connected between one of said self-propelled vehicles and said bridge means for pivoting said bridge means about the longitudinal axis thereof.

9. The apparatus of claim 2 wherein said pivot means includes a support portion carried by each one of said first and second self-propelled vehicles for pivot movement about an axis perpendicular to the support plane of said vehicles.

10. The apparatus of claim 2 wherein said pivot means includes a support pin operatively connected between said bridge means and each one of said self-propelled vehicles for pivotally moving said bridge means in a plane extending through the longitudinal axis of said bridge means.

* * * * *